(12) United States Patent
Park et al.

(10) Patent No.: US 10,996,384 B2
(45) Date of Patent: May 4, 2021

(54) OPTICAL ISOLATION ELEMENT

(71) Applicant: LG CHEM, LTD., Seoul (KR)

(72) Inventors: Seong Min Park, Daejeon (KR); Sang Choll Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/757,281

(22) PCT Filed: Oct. 22, 2018

(86) PCT No.: PCT/KR2018/012479
§ 371 (c)(1),
(2) Date: Apr. 17, 2020

(87) PCT Pub. No.: WO2019/078694
PCT Pub. Date: Apr. 25, 2019

(65) Prior Publication Data
US 2020/0386927 A1    Dec. 10, 2020

(30) Foreign Application Priority Data

Oct. 20, 2017 (KR) .................... 10-2017-0136742

(51) Int. Cl.
*G02B 5/20* (2006.01)
*G02B 5/04* (2006.01)
*G02B 5/32* (2006.01)

(52) U.S. Cl.
CPC .............. *G02B 5/203* (2013.01); *G02B 5/04* (2013.01); *G02B 5/32* (2013.01)

(58) Field of Classification Search
CPC . G02B 5/203; G02B 5/32; G02B 5/04; G02B 27/0172; G03H 2001/0439

USPC ................................................ 359/1, 15, 3
See application file for complete search history.

(56) References Cited

U.S. PATENT DOCUMENTS

| 2009/0199893 A1 | 8/2009 | Bita et al. |
| 2009/0199900 A1* | 8/2009 | Bita ................ H01L 31/0547 136/259 |
| 2010/0180946 A1* | 7/2010 | Gruhlke ............ H01L 31/0547 136/259 |

FOREIGN PATENT DOCUMENTS

| JP | 2007-279424 A | 10/2007 |
| JP | 2008-090052 A | 4/2008 |
| JP | 2010-224520 A | 10/2010 |
| JP | 2012-013902 A | 1/2012 |
| JP | 2014-010241 A | 1/2014 |
| JP | 2016-138966 A | 8/2016 |
| KR | 10-2005-0003037 | 1/2005 |
| KR | 10-0787264 A | 12/2007 |
| KR | 10-2011-0069071 A | 6/2011 |
| KR | 10-2015-0105558 A | 9/2015 |
| KR | 10-2016-0010413 A | 1/2016 |

(Continued)

Primary Examiner — Jade R Chwasz
(74) Attorney, Agent, or Firm — Dentons US LLP

(57) ABSTRACT

The present application relates to an optical isolation element comprising a first optical path changing element, a second optical path changing element and a third optical path changing element, each of those comprises a light entrance surface and a light exit surface. The optical isolation element has an excellent optical isolation ratio, may not require separate external force when driven, and can be applied to various applications such as the field of optical communication or laser optics, the field of security or privacy protection, brightness enhancement of displays, or a use for hiding and covering.

8 Claims, 3 Drawing Sheets

(56) References Cited

FOREIGN PATENT DOCUMENTS

| | | |
|---|---|---|
| KR | 10-2017-0112536 A | 10/2017 |
| WO | 2016129155 A1 | 8/2016 |

* cited by examiner

[Figure 7]
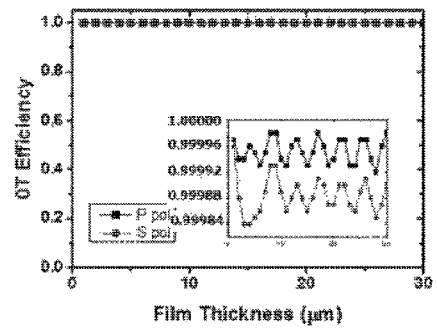
[Figure 8]
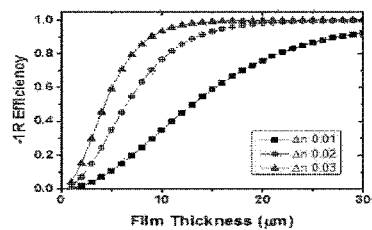
[Figure 9]
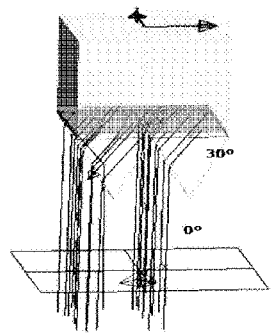
[Figure 10]
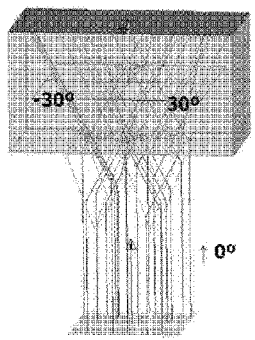

OPTICAL ISOLATION ELEMENT

This The present application is a National Phase entry pursuant to 35 U.S.C. § 371 of International Application No. PCT/KR2018/012479, filed on Oct. 22, 2018, and claims the benefit of priority of Korean Patent Application No. 10-2017-0136742, filed on Oct. 20, 2017, the disclosure of which is incorporated herein by reference in its entirety.

TECHNICAL FIELD

The present application relates to an optical isolation element.

BACKGROUND ART

An optical isolation device is a device in which light transmittance in the forward direction is higher than light transmittance in the backward direction, which is also called an optical diode. The optical isolation device can be used to prevent unnecessary reflected light in the field of optical communication or laser optics. In addition, the optical isolation device can also be applied to a building or automobile glass to be used for security or privacy protection and the like. The optical isolation device can be applied for brightness enhancement in various displays, and can also be applied to military products for hiding and covering.

As the optical isolation device, a Faraday optical isolation device has been known. The Faraday optical isolation device comprises first and second polarizers disposed so that the respective absorption axes form 45 degrees to each other, and a Faraday rotator disposed between them. The Faraday rotator rotates incident light linearly polarized by passing through the first polarizer by 45 degrees and the rotated light is transmitted through the second polarizer (forward direction). On the contrary, if the linearly polarized light transmitted through the second polarizer is rotated 45 degrees by the Faraday rotator, it becomes parallel to the absorption axis of the first polarizer, so that it cannot be transmitted through the first polarizer (backward direction).

Since the Faraday optical isolator requires a very large external magnetic field for driving and an expensive material has to be applied thereto, it is difficult to make it large in size.

DISCLOSURE

Technical Problem

It is one object of the present application to provide an optical isolation device which can be manufactured at low cost without requiring an external magnetic field for forward direction driving and which can be made large-area.

Technical Solution

In the present application, the term "optical isolation element" may mean an element configured such that the transmittance of incident light in either direction is greater than the transmittance of incident light in a direction different from the direction. In the optical isolation element, the direction in which the transmittance of the incident light is large may be referred to as a forward direction, and the direction in which it is small may be referred to as a backward direction. Here, the forward direction and the backward direction may be an angle of about 160 degrees to about 200 degrees to each other. The angle may be, for example, about 165 degrees or more, 170 degrees or more, or 175 degrees or more, and may be about 195 degrees or less, about 190 degrees or less, or about 185 degrees or less, but is not limited thereto. In addition, the light entrance surface to be described below may mean a surface on which light traveling in the forward direction is incident. Then, the light emission surface to be described below may mean a surface on which light traveling in the backward direction is incident.

In this specification, the reference wavelength of optical properties such as the terms "transmittance," "retardation value," "reflectance" and "refractive index" can be determined according to light to be isolated by using the optical isolation device. For example, when the optical isolation device is intended to isolate light in the visible light region, the reference wavelength of the transmittance or the like is, for example, a value based on light having any wavelength within the range of 400 nm to 700 nm or about 550 nm. In another example, when it is intended to isolate light in the infrared region, the reference wavelength of the transmittance or the like cab be determined on the basis of, for example, light having a wavelength of 1000 nm. In another example, when it is intended to isolate light in the ultraviolet region, the reference wavelength of the transmittance or the like can be determined on the basis of, for example, a wavelength of 250 nm.

In the present application, the term "incident angle" is an angle with a small absolute value of angles measured based on the normal of the light entrance surface or the light exit surface, unless otherwise specified. Furthermore, in the present application, the term "output angle" is an angle with a small absolute value of angles measured based on the normal of the light entrance surface or the light exit surface, unless otherwise specified. Here, the angle measured in the clockwise direction based on the normal may be represented by a positive number and the angle measured in the counterclockwise direction may be represented by a negative number.

In the present application, the value representing the angle may be a value considering an error range. The value representing the angle may mean, for example, vertical, parallel, an incident angle, an output angle and/or a tilt angle, and the error range may be within ±10 degrees, within ±9 degrees, within ±8 degrees, within ±7 degrees, ±6 degrees, within ±5 degrees, within ±4 degrees, within ±3 degrees, within ±2 degrees, or within ±1 degree.

The present application relates to an optical isolation element. The optical isolation element of the present application comprises a first optical path changing element, a second optical path changing element and a third optical path changing element in sequential order, wherein each of the first, second and third optical path changing elements comprises a light entrance surface and a light exit surface. In addition, the first optical path changing element may be a holographic optical element.

In the present application, the description of the terms "light entrance surface" and "light exit surface" is as described above.

In the present application, the term "optical path changing element" may mean an element capable of changing the traveling path of incident light by refracting, diffracting or reflecting the incident light.

In the present application, the term "holography" may mean a technique of forming an interference pattern in a photosensitive medium to reproduce a three-dimensional image called a hologram. Furthermore, the term "holographic optical element (HOE)" may refer to an element comprising a photosensitive medium in which an interference pattern is formed as above. Specifically, the holographic optical element may mean an element in which an interference pattern is recorded using recording light on a film having photosensitive particles.

Here, the interference pattern may serve as a diffraction grating capable of diffracting reproduction light irradiated to the holographic optical element. Furthermore, the interference pattern can be repeated periodically.

The holographic optical element may comprise a photosensitive material as a recording medium. As long as the photosensitive material is a material capable of recording the interference pattern by irradiation with the recording light, the type is not particularly limited, where a material known to be capable of functioning as the photosensitive material can be applied. As the photosensitive material, a photopolymer, a photoresist, a silver halide emulsion, a dichromated gelatin, a photographic emulsion, a photothermoplastic or an optical diffraction (photorefractive) material can be applied.

The holographic optical element may also be, for example, in the form of a film consisting solely of a photosensitive material (e.g., a photopolymer), or may also be in the form of a film having a layered structure such as a form that a substrate and a layer of a photopolymer are laminated.

In the present application, the "first optical path changing element" may mean an optical element capable of emitting light, which is incident at a predetermined incident angle, at an output angle different from the incident angle. A detailed description thereof will be described below.

In one example, the first optical path changing element may be an element configured such that the light incident at an incident angle of a first angle can be emitted at an output angle of a second angle. The first angle and the second angle may be different angles. The first angle may be more than −90 degrees and less than 90 degrees. In another example, the first angle may be −80 degrees or more, −70 degrees or more, −60 degrees or more, −50 degrees or more, −40 degrees or more, −30 degrees or more, −20 degrees or more, −10 degrees or more, or −5 degrees or more, and may be 80 degrees or less, 70 degrees or less, 60 degrees or less, 50 degrees or less, 40 degrees or less, 30 degrees or less, 20 degrees or less, 10 degrees or less, or 5 degree or less, and may be about 0 degrees.

The second angle may be more than 0 degrees and less than 90 degrees. In another example, the second angle may be 5 degrees or more, 10 degrees or more, 15 degrees or more, 20 degrees or more, or 25 degrees or more, and may be 85 degrees or less, 80 degrees or less, 75 degrees or less, 70 degrees or less, 65 degrees or less, 60 degrees or less, 55 degrees or less, 50 degrees or less, 45 degrees or less, 40 degrees or less, or 35 degrees or less, and may also be about 30 degrees.

In another example, the second angle may be more than −90 degrees and less than 0 degrees. In another example, the second angle may be −5 degrees or less, −10 degrees or less, −15 degrees or less, −20 degrees or less, or −25 degrees or less, and −85 degrees or more, −80 degrees or more, −75 degrees or more −70 degrees or more, −65 degrees or more, −60 degrees or more, −55 degrees or more, −50 degrees or more, −45 degrees or more, −40 degrees or more, or −35 degrees or more, and may be about −30 degrees.

In one example, the second optical path changing element may be an element configured such that the light incident on the light entrance surface or the light exit surface at an incident angle of the second angle can be transmitted, and the light incident on the light entrance surface or the light exit surface at an incident angle of a third angle can be reflected in a direction parallel to the direction of the incident light. That is, the second optical path changing element may be an element configured such that the light incident on the light exit surface at an incident angle of the third angle is emitted at the same angle as the third angle but in the opposite direction. The second angle and the third angle may be different angles, and the second angle may be as described above.

In one example, the third angle may be more than 0 degrees and less than 90 degrees. In another example, the third angle may be 5 degrees or more, 10 degrees or more, 15 degrees or more, 20 degrees or more, or 25 degrees or more, and may be 85 degrees or less, 80 degrees or less, 75 degrees or less, 70 degrees or less, 65 degrees or less, 60 degrees or less, 55 degrees or less, 50 degrees or less, 45 degrees or less, 40 degrees or less, or 35 degrees or less, and may also be about 30 degrees. In another example, the third angle may be more than −90 degrees and less than 0 degrees. In another example, the third angle may be −5 degrees or less, −10 degrees or less, −15 degrees or less, −20 degrees or less, or −25 degrees or less, and −85 degrees or more, −80 degrees or more, −75 degrees or more −70 degrees or more, −65 degrees or more, −60 degrees or more, −55 degrees or more, −50 degrees or more, −45 degrees or more, −40 degrees or more, or −35 degrees or more, and may be about −30 degrees.

In one example, the third optical path changing element may be an element configured such that the light incident on the light entrance surface at an incident angle of the second angle can be emitted at an output angle of a fourth angle, and the incident light incident on the light exit surface at an incident angle of the fourth angle can be split and emitted at output angles of the second angle or the third angle.

Here, the light quantity of the light emitted from the third optical path changing element at an output angle of the second angle may be 95% or less relative to the light quantity of the light incident on the light exit surface of the third optical path changing element at an incident angle of the fourth angle. In another example, the ratio may be about 90% or less, about 85% or less, about 80% or less, about 75% or less, about 70% or less, about 65% or less, about 60% or less, or about 55% or less, but is not particularly limited thereto. The lower limit of the ratio is not particularly limited, but may be, for example, more than 0%, about 5% or more, about 10% or more, about 15% or more, about 20% or more, about 25% or more, about 30% or more, about 35% or more, about 40% or more, or about 45% or more. Then, in another example, the ratio may be about 50% or so.

Here, the light quantity of the light emitted from the third optical path changing element at an output angle of the third angle may be 5% or more relative to the light quantity of the light incident on the light exit surface of the third optical path changing element at an incident angle of the fourth angle. The ratio is not particularly limited, but may be, for example, about 10% or more, about 15% or more, about 20% or more, about 25% or more, about 30% or more, about 35% or more, about 40% or more, or about 45% or more. In addition, the upper limit of the ratio is not particularly limited, but may be less than 100%, about 95% or less, about 90% or less, about 85% or less, about 80% or less, about 75% or less, about 70% or less, about 65% or less, about 60% or less, or about 55% or less. Then, in another example, the ratio may be about 50% or so.

The fourth angle may be −80 degrees or more, −70 degrees or more, −60 degrees or more, −50 degrees or more, −40 degrees or more, −30 degrees or more, −20 degrees or more, −10 degrees or more, or −5 degrees or more, and may be 80 degrees or less, 70 degrees or less, 60 degrees or less, 50 degrees or less, 40 degrees or less, 30 degrees or less, 20 degrees or less, 10 degrees or less, or 5 degrees or less, and may also be about 0 degrees.

The optical isolation element may be configured such that the absolute value of the difference between the first angle and the fourth angle is in a range of 0 degrees to 10 degrees. In another example, the value may be 9 degrees or less, 8 degrees or less, 7 degrees or less, 6 degrees or less, 5 degrees or less, 4 degrees or less, 3 degrees or less, 2 degrees or less, or 1 degree or less. Therefore, the first angle and the fourth angle may be substantially equal to each other.

The optical isolation element may be configured such that the absolute value of the sum of the second angle and the third angle is in a range of 0 degrees to 10 degrees. In another example, the value may be 9 degrees or less, 8 degrees or less, 7 degrees or less, 6 degrees or less, 5 degrees or less, 4 degrees or less, 3 degrees or less, 2 degrees or less, or 1 degree or less. Therefore, the second angle and the third angle are opposite in sign to each other, and their numerical values may be substantially equal to each other.

As the optical isolation element comprises elements configured such that the incident light or the emission light satisfies the first to fourth angles as described above, it can realize an element that the transmittance of the light incident on the light entrance surface (forward direction) is higher than the transmittance of the light incident on the light exit surface (backward direction). That is, it can realize an optical element in which the transmittance of the light incident in both directions is asymmetric.

In one example, the light exit surface of the first optical path changing element and the light entrance surface of the second optical path changing element, and the light exit surface of the second optical path changing element and the light entrance surface of the third optical path changing element can be opposed to each other.

In the present application, the fact that any one surface and another surface are opposed to each other may mean that both surfaces are located in the form that they face each other.

FIG. 1 is a schematic diagram showing a structure of an optical isolation element of the present application. According to FIG. 1, the optical isolation element (1) of the present application can comprise the first optical path changing element (10), the second optical path changing element (20) and the third optical path changing element (30) in sequential-order. The first optical path changing element (10) can emit the light incident on the light entrance surface at an incident angle of the first angle ($\theta_1$) to at the second angle ($\theta_2$) different from the first angle ($\theta_1$) and emit the light incident on the light exit surface at an incident angle of the second angle ($\theta_2$) at the first angle ($\theta_1$); the second optical path changing element (20) can transmit the light incident on the light entrance surface or the light exit surface at an incident angle of the second angle ($\theta_2$) and reflect the light incident on the light entrance surface or the light exit surface at an incident angle of the third angle ($\theta_3$) different from the second angle ($\theta_2$) in a direction parallel to the direction of the incident light; and the third optical path changing element (30) can emit the light incident on the light entrance surface at an incident angle of the second angle ($\theta_2$) at an output angle of the fourth angle ($\theta_4$), and split and emit the light incident on the light exit surface at an incident angle of the fourth angle ($\theta_4$) at an output angles of the second angle ($\theta_2$) and the third angle ($\theta_3$).

In one example, the holographic optical element included in the optical isolation element may have an average refractive index in a range of 1.4 to 1.6. That is, the average refractive index of the first optical path changing element may be in the range of 1.4 to 1.6. Then, when a reflective holographic optical element to be described below is applied as the second optical path changing element, its average refractive index may also be in the range of 1.4 to 1.6. In another example, the range may be 1.41 or more, 1.42 or more, 1.43 or more, 1.44 or more, 1.45 or more, 1.46 or more, 1.47 or more, 1.48 or more, or 1.49 or more, and may be 1.59 or less, 1.58 or less, 1.57 or less, 1.56 or less, 1.55 or less, 1.54 or less, 1.53 or less, 1.52 or less, or 1.51 or less, but is not particularly limited thereto.

In the present application, the "average refractive index" of any element may mean an average of a maximum refractive index and a minimum refractive index of an element to be measured. For example, if the maximum refractive index of any element is about 1.8 and the minimum refractive index is about 1.2, the average refractive index of the element may be about 1.5. The reference wavelength of the refractive index is as described above, and the measuring method thereof is also known.

In one example, the maximum refractive index may be 1.5 or more, 1.55 or more, 1.6 or more, 1.65 or more, 1.7 or more, 1.75 or more, or 1.8 or more, and may be 2.0 or less, 1.95 or less, 1.9 or less, or 1.85 or less. In addition, the minimum refractive index may be 1.0 or more, 1.05 or more, 1.1 or more, 1.15 or more, or 1.20 or more, and may be 1.4 or less, 1.35 or less, 1.3 or less, or 1.25 or less.

In one example, the difference between the maximum refractive index and the minimum refractive index in the holographic optical element may be in a range of 0.002 to 0.6. The value is not particularly limited, but may be, for example, 0.003 or more, 0.004 or more, 0.005 or more, 0.006 or more, 0.007 or more, or 0.008 or more, and may be 0.60 or less, 0.55 or less, 0.50 or less, 0.40 or less, 0.45 or less, 0.35 or less, 0.30 or less, 0.25 or less, or 0.20 or less.

Hereinafter, one-half of the above value will be referred to as refractive index modulation ($\Delta n$). The interference pattern included in the holographic optical element may be formed over the entire region of the holographic optical element and the interference pattern may exhibit a gradient of the refractive index according to the information of the recording light. At this time, the refractive index modulation of the holographic optical element may mean one-half of the absolute value of the difference between the maximum value and the minimum value in the above-described refractive index gradient. The method of controlling the refractive index modulation is well known, and for example, when a holographic optical element is manufactured by forming an interference pattern through laser exposure on a photosensitive material, the refractive index modulation can be adjusted, as the conditions (laser intensity, exposure time, etc.) of the above-described laser exposure change.

In one example, when the holographic optical element is applied to the second optical path changing element, the element may be a reflective holographic optical element. Here, the "reflective holographic optical element" may mean a holographic optical element that the light incident at a predetermined incident angle is reflected in a direction parallel to the direction of the incident light and the light incident at an incident angle of an angle different from the incident angle is transmitted.

The transmissive holographic optical element and the reflective holographic optical element can be distinguished according to the angle formed by the normal to the interference pattern and the normal to the light entrance surface or the light exit surface of the holographic optical element.

Specifically, the first optical path changing element may be configured to satisfy Equation 1 below. In addition, the reflective holographic optical element may be configured to satisfy Equation 2 below. The holographic optical element including an interference pattern can function as a transmissive holographic optical element in the case of satisfying Equation 1 and can function as a reflective holographic optical element in the case of satisfying Equation 2:

$$90 - \theta_c \leq |\theta_G| \quad \text{[Equation 1]}$$

$$|\theta_G| \leq \theta_c \quad \text{[Equation 2]}$$

In Equations 1 and 2, $\theta_G$ may be an angle (unit: degree) with the smallest absolute value among angles formed by the normal to the interference pattern and the normal to the light entrance surface or the light exit surface of the holographic optical element, and $\theta_c$ may be the critical angle (unit: degree) of the holographic optical element.

In the present application, the term "critical angle" may mean a positive value of incident angles of light incident on a light entrance surface of any member when the total reflection of the light is started. The critical angle ($\theta_c$) of the holographic optical element can be calculated as arcsin (1/n) when the refractive index of the holographic optical element for a predetermined wavelength, or the average refractive index is n. Therefore, when the average refractive index of the holographic optical element is determined, its critical angle can be determined, and accordingly, when the element is designed so that the $\theta_G$ value of the interference pattern in the holographic optical element satisfy the above-described equation 1 or equation 2, the element may be a transmissive holographic optical element or a reflective holographic optical element. Furthermore, if the $\theta_G$ value of the interference pattern in the holographic optical element is determined, the pitch of the interference pattern may also be determined.

In the present application, the term "refractive index" means an absolute refractive index, which is a refractive index determined by defining a refractive index in a vacuum as 1 and comparing the speed of light in a medium with the speed of light in the vacuum.

In one example, it can be determined according to a method of exposing a holographic optical element having the same composition whether any holographic optical element is a transmissive holographic optical element or a reflective holographic optical element. Specifically, in the process of forming an interference pattern on any photosensitive material through laser exposure to produce a holographic optical element, it can be determined depending on the direction where object light and reference light are incident whether the holographic optical element is a transmissive type or a reflective type. More specifically, when both the object light and the reference light to be irradiated at the time of manufacturing the holographic optical element are incident on the same surface of the photosensitive material, a transmissive holographic optical element satisfying Equation 1 above can be manufactured. In addition, when the object light and the reference light are incident on different surfaces of the photosensitive material, a reflective holographic optical element satisfying Equation 2 above can be manufactured. Here, when the holographic optical element is manufactured, the object light means light in which the recording light is diffusely reflected from the object surface to reach the photosensitive material, and the reference light means light in which the recording light directly reaches the photosensitive material.

In one example, the first optical path changing element may have a thickness of 1 μm or more. Specifically, the thickness may be about 2 μm or more, about 3 μm or more, about 4 μm or more, about 5 μm or more, about 6 μm or more, about 7 μm or more, or about 8 μm or more. In addition, the upper limit of the thickness is not particularly limited and may also be, for example, 200 μm or less, 190 μm or less, 180 μm or less, 170 μm or less, 160 μm or less, or 150 μm or less.

In another example, when a transmissive holographic optical element is applied as the first optical path changing element, its thickness may also be 30 μm or more. In addition, the value may be specifically 35 μm or more, 40 μm or more, 45 μm or more, or 50 μm or more, and may also be 200 μm or less, 190 μm or less, 180 μm or less, 170 μm or less, 160 μm or less, or 150 μm or less. Particularly, within the above range, the light quantity of the light emitted at an output angle of the second angle can be particularly increased relative to the light quantity of the light incident on the light entrance surface of the transmissive holographic optical element at an incident angle of the first angle.

In one example, the difference between the maximum refractive index and the minimum refractive index of the transmissive holographic optical element may be in the range of 0.01 to 0.03. In another example, the value may be 0.012 or more, 0.014 or more, or 0.016 or more, and may be 0.028 or less, 0.026 or less, 0.024 or less, 0.022 or less, or 0.02 or less. That is, when the first optical path changing element is a transmissive holographic optical element, its refractive index modulation may be in the range of 0.005 to 0.015, specifically may be 0.006 or more, 0.007 or more, or 0.008 or more, and may be 0.014 or less, 0.013 or less, 0.012 or less, or 0.01 or less. Within the above range, the light quantity of the light emitted at an output angle of the second angle can be particularly increased relative to the light quantity of the light incident on the light entrance surface of the first optical path changing element.

In one example, the second optical path changing element may have a thickness of 5 μm or more. Specifically, the thickness may be about 5 μm or more, 6 μm or more, 7 μm or more, or 8 μm or more, and may be 500 μm or less, 490 μm or less, 480 μm or less, 470 μm or less, 460 μm or less, μm or less, 450 μm or less, 440 μm or less, 430 μm or less, 420 μm or less, 410 μm or less, or 400 μm or less.

In another example, when a reflective holographic optical element is applied as the second optical path changing element, its thickness may be 10 μm or more. Specifically, the value may be 10 μm or more, 15 μm or more, 20 μm or more, or 25 μm or more, and may also be 500 μm or less, 490 μm or less, 480 μm or less, 470 μm or less, 460 μm or less, 450 μm or less, 440 μm or less, 430 μm or less, 420 μm or less, 410 μm or less, or 400 μm or less. Within the above range, the reflection efficiency (ratio of the light quantity of reflected light to the light quantity of incident light) of the light incident on the light exit surface of the reflective holographic optical element at an incident angle of the third angle can be particularly increased.

In another example, the difference between the maximum refractive index and the minimum refractive index in the reflective holographic optical element may be 0.06 or more. Specifically, the value may be 0.07 or more, 0.08 or more, 0.09 or more, 0.10 or more, 0.11 or more, or 0.12 or more, and the upper limit is not particularly limited, but may be 0.60 or less, 0.55 or less, 0.50 or less, 0.45 or less, 0.40 or less, 0.35 or less, 0.30 or less, 0.25 or less, or 0.20 or less. That is, the refractive index modulation of the reflective holographic optical element may be 0.03 or more. Specifically, the value may be 0.04 or more, 0.05 or more, or 0.06 or more, and the upper limit is not particularly limited, but may be, for example, 0.3 or less, 0.25 or less, 0.2 or less, 0.15 or less or 0.1 or less.

In another example, the second optical path changing element may be a prism film comprising a metal layer.

In the present application, the term "prism" may mean a polyhedral optical element used when the incident light is refracted and/or dispersed. Specifically, the prism is formed of a transparent solid material refracting or reflecting the incident light, which may mean an optical element that is transparent and polyhedral. In addition, the "prism film" may mean a film in which a number of prisms are regularly or irregularly disposed. The shape of the prism is not particularly limited as long as it can change the path of the light incident on the optical element. For example, as the prism, a prism that the shape of the cross section orthogonal to the ridge line of the prism is a triangle may also be applied.

In one example, the prism of the prism film comprising a metal layer, which may be applied as the second optical path changing element, may be a triangular prism. The triangle may be an isosceles triangle, an equilateral triangle or an inequilateral triangle.

In the present application, the term "triangular prism" may mean a prism having a triangular shape in the cross section orthogonal to the ridge line of the prism, and specifically, may mean a prism that the shape of the cross section orthogonal to the ridge line of the prism is a triangle with one base and two hypotenuses. The inequilateral triangular prism may mean a triangular prism that at least two sides of three sides of the cross section orthogonal to the ridge line of the triangular prism have different lengths. In one example, in a triangular prism applied to the second optical path changing element, the apex angle of the triangle may be in a range of 70 degrees to 120 degrees. Specifically, the apex angle may be, for example, 72 degrees or more, 74 degrees or more, 76 degrees or more, 78 degrees or more, 80 degrees or more, 82 degrees or more, 84 degrees or more, 86 degrees or more, 88 degrees or more, or 90 degrees or more, and may be 118 degrees or less, 116 degrees or less, 114 degrees or less, 112 degrees or less, 110 degrees or less, 108 degrees or less, 106 degrees or less, 104 degrees or less, 102 degrees or less, 100 degrees or less, 98 degrees or less, 96 degrees or less, 94 degrees or less, 92 degrees or less, or 90 degrees or less.

In the present application, the apex angle of a triangle may mean an angle formed by two hypotenuses of a triangle in a triangular prism.

In one example, the triangular prism applied to the second optical path changing element may also have its apex, formed by two hypotenuses, facing the light entrance surface of the second optical path changing element or facing the light exit surface of the second optical path changing element.

In one example, the prism film comprising a metal layer may be a triangular prism film comprising a metal layer provided on at least one hypotenuse of the triangle. That is, the metal layer may be formed on either one of two hypotenuses or both two hypotenuses of the triangle constituting the prism. The method of forming a metal layer is not particularly limited, and a known vapor deposition method, for example, a method such as physical vapor deposition or chemical vapor deposition may be applied.

The metal constituting the metal layer is not particularly limited as long as it can reflect incident light. As the metal, one or more selected from the group consisting of aluminum (Al), silver (Ag), copper (Cu), gold (Au), nickel (Ni), palladium (Pd), platinum (Pt) and chromium (Cr), an alloy of two or more of the foregoing, or an oxide of one or more of the foregoing may be applied.

By applying the prism film comprising a metal layer as the second optical path changing element, the light incident on the light entrance surface or the light exit surface of the second optical path changing element at the second angle may be transmitted, and the light incident on the light entrance surface or the light exit surface at an angle different from the second angle, for example, the third angle may be reflected in a direction parallel to the direction of the incident light.

In one example, the prism film can be applied as the third optical path changing element. Furthermore, the prism of the prism film applied as the third optical path changing element may be a triangular prism, where the shape of the triangle may be an equilateral triangle, an isosceles triangle or an inequilateral triangle, and specifically, may be an isosceles triangle. The isosceles triangular prism may mean a prism having two hypotenuses of the same length in the cross section orthogonal to the ridge line of the triangular prism. In one example, the triangular prism applied to the third optical path changing element may have its apex, formed by two hypotenuses, facing the light entrance surface of the third optical path changing element, or the light exit surface of the third optical path changing element.

In one example, in the triangular prism applied as the third optical path changing element, the apex angle of the triangle may be in a range of 40 degrees to 50 degrees. Specifically, the apex angle may be 40 degrees or more, 41 degrees or more, 42 degrees or more, or 43 degrees or more, and may be 50 degrees or less, 49 degrees or less, 48 degrees or less, 47 degrees or less, or 46 degrees or less.

The optical isolation element may have forward transmittance of 50% or more. The value may be about 50% or more, about 55% or more, about 60% or more, about 65% or more, about 70% or more, about 75% or more, about 80% or more, about 85% or more, about 90% or more, or 95% or more. The upper limit of the forward transmittance may be about 100%.

The optical isolation element may also have backward transmittance of less than about 50%, about 45% or less, about 40% or less, about 35% or less, about 30% or less, about 25% or less, about 20% or less, about 15% or less, about 10% or less, or about 5% or less. The lower limit of the backward transmittance may be about 0% or so.

In the present application, the "transmittance" of a certain member means that when the member has been irradiated with light having a predetermined wavelength, the light quantity of the light transmitted through the member is expressed in % relative to the irradiated light quantity. Therefore, the forward transmittance of the optical isolation element may mean the ratio of the light quantity of the emission light emitted from the third optical path changing element relative to the light quantity of the incident light incident on the light entrance surface of the first optical path changing element. In addition, the backward transmittance of the optical isolation element may mean the ratio of the light quantity of the emission light emitted from the transmissive holographic optical element relative to the light quantity of the incident light incident on the light exit surface of the third optical path changing element.

The present application also relates to an optical isolation device. The optical isolation device of the present application may comprise at least one optical isolation element as described above.

In the present application, the term "optical isolation device" is a device comprising an optical isolation element and has an optical isolation function. Accordingly, the description of the forward direction and the backward direction as described above can be applied as it is in the optical isolation device as well.

The optical isolation device may comprise one or two or more optical isolation elements as described above. When two or more optical isolation elements are included in the optical isolation device, the optical isolation elements can each be disposed such that the light transmitted through any one of the optical isolation elements along the forward direction can enter the first optical path changing element side of the other optical isolation element. For example, when the optical isolation device comprises the first optical isolation element and the second optical isolation element positioned in the forward direction, the elements may be positioned such that the light exit surface of the third optical path changing element in the first optical isolation element and the light entrance surface of the first optical path changing element in the second optical isolation element are opposed to each other. In this way, the optical isolation device can further improve an optical isolation ratio by comprising a plurality of optical isolation elements.

In the present application, the optical isolation ratio indicates how much the forward transmittance has increased relative to the backward transmittance, which is defined as Equation 3 below and may mean that the larger the value, the better the optical isolation performance is.

The light transmitted through the plurality of optical isolation elements in the forward direction continues to be transmitted without loss of the light quantity, but in the case of the light transmitted in the backward direction, the light quantity thereof is reduced exponentially, for example, to $(0.5)n$ times (where, n means the number of optical isolation elements). Therefore, as the number of the optical isolation elements included in the optical isolation device increases, the optical isolation ratio thereof can increase.

In one example, the ratio of the transmittance of the light incident in the forward direction and the transmittance of the light incident in the backward direction in the optical isolation device can be about 3 dB or more, by the isolation ratio (IR) depending on Equation 3 below:

$$IR = 10 \times n \times \log(F/B) \quad \text{[Equation 3]}$$

In Equation 3, IR is an isolation ratio, n is the number of optical isolation elements included in the optical isolation device, F is the transmittance of the light incident on the optical isolation device in the forward direction, and B is the transmittance of the light incident on the optical isolation device in the backward direction.

The transmittance (F) of the light incident in the forward direction of the optical isolation device may be about 50% or more, about 55% or more, about 60% or more, about 65% or more, about 70% or more, about 75% or more, about 80% or more, about 85% or more, about 90% or more, or about 95% or more. The upper limit of the forward transmittance may be about 100%. Also, the transmittance of the light incident in the backward direction of the optical isolation device may be less than about 50%, about 45% or less, about 40% or less, about 35% or less, about 30% or less, about 25% or less, about 20% or less, about 15% or less, about 10% or less, or about 5% or less. The lower limit of the backward transmittance may be about 0% or so.

In the present application, the "transmittance" of a certain member means that when the member has been irradiated with light having a predetermined wavelength, the light quantity of the light transmitted through the member is expressed in % relative to the irradiated light quantity.

Such an optical isolation device may also comprise additional constitutions. For example, the optical isolation device may further comprise, if necessary, a light-path controller, such as a prism or a reflective plate, which can additionally control the light path, in addition to those included in the above-described optical isolation element. In addition, the optical isolation device may comprise, if necessary, additional optical components other than the above. For example, the optical isolation device may comprise an optical component, such as a louver plate. Such a louver plate or the like may be provided on, for example, the side where the light traveling in the forward direction is finally exited, for example, the light exit surface of the above-mentioned second optical path changing element.

Advantageous Effects

The optical isolation of the present application can be manufactured at low cost without requiring an external magnetic field for forward direction driving and can be made large-area.

BRIEF DESCRIPTION OF DRAWINGS

FIG. 7 is the 0T efficiency evaluation results of the second optical path changing element.

FIG. 8 is the −1R efficiency evaluation results of the second optical path changing element.

FIG. 9 is a schematic diagram showing the forward light path of the third optical path changing element.

FIG. 10 is a schematic diagram showing the backward light path of the third optical path changing element.

MODE FOR INVENTION

Hereinafter, the optical isolation element of the present application will be described in detail through examples. However, the scope of the present application is not limited by the following examples.

EXAMPLES

For the evaluation of the optical isolation element of the present application, the following first optical path changing element, second optical path changing element and third optical path changing element were used.

Figure 2:
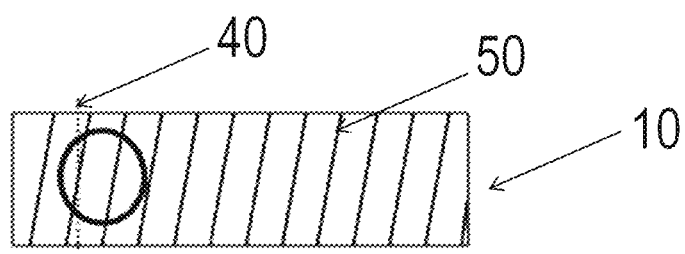
FIGS. 2 and 3 are schematic diagrams showing the structure of the first optical path changing element.
Figure 3:
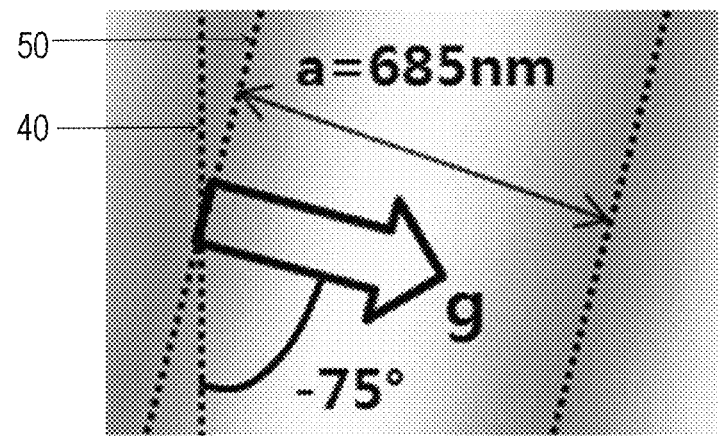

A transmissive holographic optical element applied as the first optical path changing element will be described with reference to FIGS. 2 and 3. As the transmissive holographic optical element (10), a holographic optical element was used, in which an interference pattern (50) was formed on a conventional photopolymer (average refractive index at any one of wavelengths from 300 nm to 800 nm: about 1.5, critical angle: about 41 degrees) as in FIG. 2 by suitably adjusting laser exposure conditions. FIG. 3 is an enlarged view of a portion indicated by a circle in FIG. 2. As shown in FIG. 3, in the transmissive holographic optical element, the angle formed by the normal (g) to the interference pattern (50) and the normal (40) to the light entrance surface of the transmissive holographic optical element was about −75 degrees, and the pitch (a) of the interference pattern was about 685 nm.

Figure 4:
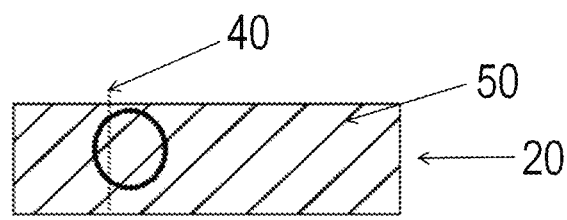
FIGS. 4 and 5 are schematic diagrams showing the structure of the second optical path changing element.
Figure 5:
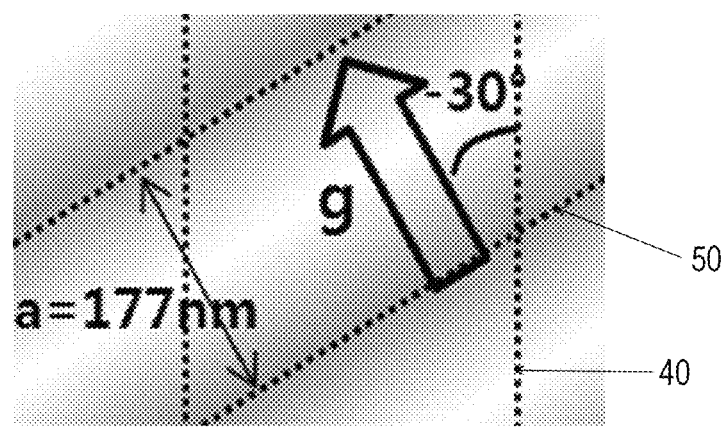

The setting contents of the second optical path changing element will be described with reference to FIGS. 4 and 5. As the second optical path changing element, a reflective holographic optical element was used. As the reflective holographic optical element (20), a holographic optical element was used, in which an interference pattern (50) was formed on a conventional photopolymer (average refractive index at any one of wavelengths from 300 nm to 800 nm: about 1.5, critical angle: about 41 degrees) as in FIG. 4 by suitably adjusting laser exposure conditions. FIG. 5 is an enlarged view of a portion indicated by a circle in FIG. 4. As shown in FIG. 5, in the reflective holographic optical element, the angle formed by the normal (g) to the interference pattern (50) and the normal (40) to the light entrance surface of the second optical path changing element was about −30 degrees, where the pitch (a) of the interference pattern was about 177 nm.

As the third optical path changing element, an isosceles triangular prism film was used, in which the apex angle was about 44 degrees, the refractive index was about 1.46 for any one of wavelengths from 300 nm to 800 nm, and the apex faced the light exit surface of the third optical path changing element.

The emission efficiency of the first optical path changing element and the second optical path changing element was evaluated by using an RCWA (rigorous coupled wave analysis) function of the VirtualLab Fusion software (LightTrans).

Figure 6:
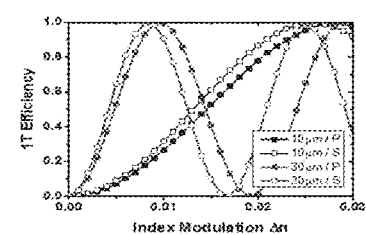
FIG. 6 is the 1T efficiency evaluation results of the first optical path changing element.

FIG. 6 shows the relationship between the index modulation and the 1T efficiency in the first optical path changing element. Here, the 1T efficiency means the light quantity of the light emitted at an angle of about 30 degrees relative to the light quantity of the light incident on the light entrance surface of the first optical path changing element at an incident angle of about 0 degrees. According to FIG. 6, it can be confirmed that as the refractive index modulation of the transmissive holographic optical element increases, the 1T efficiency increases and decreases periodically, where the larger the thickness of the transmissive holographic optical element, the shorter the period. For example, when a transmissive holographic optical element is manufactured by a laser exposure method, it can be seen from this that in the case of appropriately adjusting the exposure condition and its thickness, the transmissive holographic optical element can have the 1T efficiency over a certain level. For example, when the thickness is about 30 μm and the refractive index modulation is set to about 0.008, it can be seen that the 1T efficiency of the transmissive holographic optical element can approach 1.

The relationship between the thickness and the 0T efficiency in the reflective holographic optical element was shown in FIG. 7. Here, the 0T efficiency means the light quantity of the light transmitted through the reflective holographic optical element relative to the light quantity of the light incident on the light entrance surface of the reflective holographic optical element at an angle of about 30 degrees. According to FIG. 7, it can be seen that, regardless of the thickness of the reflective holographic optical element, most of the light incident at an angle of about 30 degrees can be transmitted through the reflective holographic optical element.

FIG. 8 shows the relationship between the thickness and the −1R efficiency in the reflective holographic optical element. Here, the −1R efficiency means the light quantity of the light that is reflected in a direction parallel to the incident light relative to the light quantity of the light incident on the light exit surface of the reflective holographic optical element at an incident angle of about −30 degrees. According to FIG. 8, it can be seen that in the same refractive index modulation, as the thickness of the reflective holographic optical element increases, the −1R efficiency increases. Furthermore, according to FIG. 8, it can be seen that at the same thickness, as the refractive index modulation of the reflective holographic optical element increases, the −1R efficiency increases. Particularly, when the refractive index modulation is 0.03 or more, it can be seen that the reflective holographic optical element can have −1R efficiency of 0.8 or more, even if it has a thin thickness of 8 μm or so.

The third optical path changing element performance was simulated using LightTools software (Synopsys).

The path of the light emitted when light of approximately 30 degrees was incident on the light entrance surface of the third optical path changing element was shown in FIG. 9. According to FIG. 9, it can be seen that when the light of about 30 degrees is incident on the light entrance surface of the third optical path changing element, most of the incident light is emitted as light of about 0 degrees.

The path of the light emitted when light of approximately 0 degrees was incident on the light exit surface of the third optical path changing element was shown in FIG. 10. According to FIG. 10, it can be seen that when the light of about 0 degrees is incident on the light exit surface of the third optical path changing element, one-half or so of the incident light is emitted as light of about 30 degrees and the remainder is emitted as light of about −30 degrees.

Figure 1:
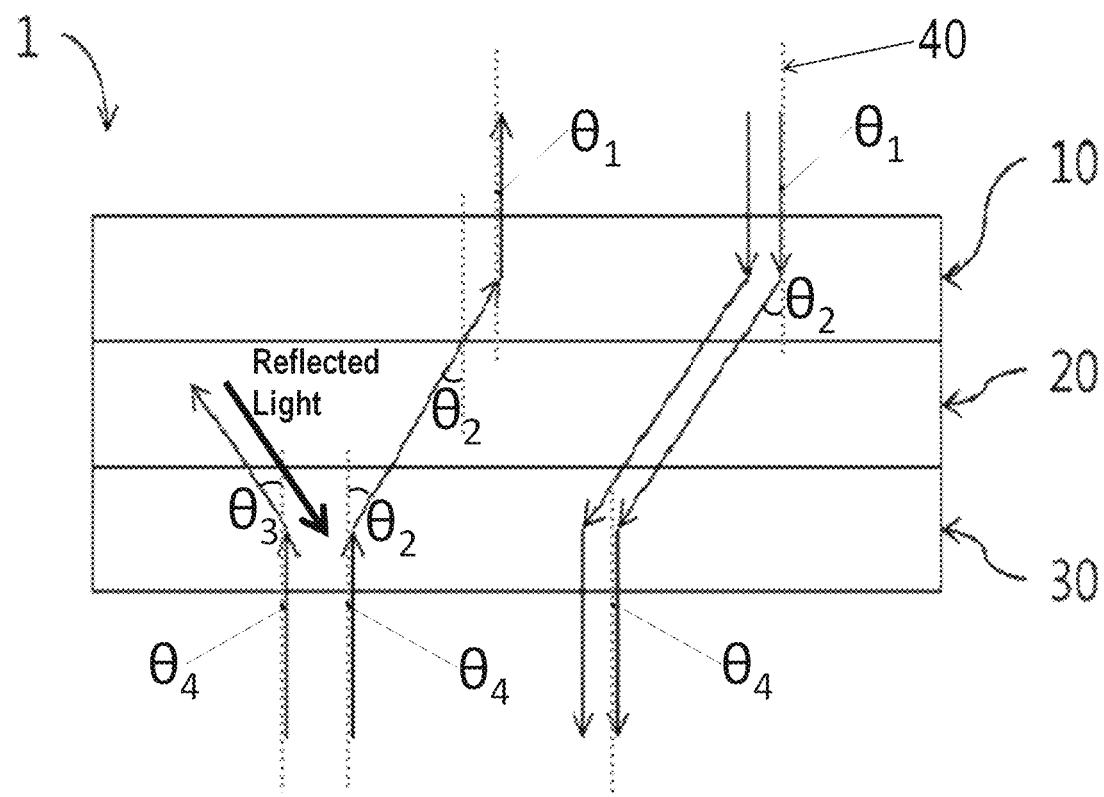
FIG. 1 is a schematic diagram showing the structure of the optical isolation element according to the present application.

The shape manufactured in the form of a film, in which the first optical path changing element (10), the second optical path changing element (20) and the third optical path changing element (30), having the above performance, were disposed as shown in FIG. 1, was subjected to computer modeling, and its performance was evaluated through a simulation software. As a result of irradiating an element having such a form with light as shown in FIG. 1 (forward irradiation), the ratio (F/B) of the obtained forward transmittance (F) and the backward transmittance (B) obtained by irradiating it with light in the opposite direction was about 2, and the isolation ratio (IR) confirmed by substituting it into Equation 3 was about 3 dB.

The invention claimed is:

1. An optical isolation element comprising a first optical path changing element, a second optical path changing element and a third optical path changing element in sequential order,
    wherein each of the first, second and third optical path changing elements comprises a light entrance surface and a light exit surface,
    wherein the first optical path changing element is an element by which the light incident on the light entrance surface at an incident angle of a first angle, in a range of more than −90 degrees and less than 90 degrees, is emitted at an output angle of a second angle different from the first angle, and the light incident on the light exit surface at an incident angle of the second angle is emitted at an output angle of the first angle,
    the second optical path changing element is an element by which the light incident on the light entrance surface or the light exit surface at an incident angle of the second angle is transmitted, and the light incident on the light entrance surface or the light exit surface at an incident angle of a third angle different from the second angle is reflected in a direction parallel to the direction of the light incident on the light entrance surface or the light exit surface, the third optical path changing element is an element by which the light incident on the light entrance surface at an incident angle of the second angle is emitted at an output angle of a fourth angle, and the light incident on the light exit surface at an incident angle of the fourth angle is split and emitted at output angles of the second angle or the third angle, the second angle and the third angle are each in a range of more than 0 degrees and less than 90 degrees, or in a range of more than −90 degrees and less than 0 degrees, the fourth angle is in a range of more than −90 degrees and less than 90 degrees, the absolute value of the difference between the first angle and the fourth angle is in a range of 0 degrees to 10 degrees, the absolute value of the sum of the second angle and the third angle is in a range of 0 degrees to 10 degrees, the first optical path changing element comprises an interference pattern in a form of a grating and is a transmissive holographic optical element satisfying Equation 1 below, the second optical path changing element comprises an interference pattern in a form of a grating and is a reflective holographic optical element satisfying Equation 2 below, and the third optical path changing element is an isosceles triangular prism film:

$$90-\theta_c < |\theta_G| \quad \text{[Equation 1]}$$

wherein in Equation 1, $\theta_G$ is an angle (unit: degree) with the smallest absolute value among angles formed by the normal to the interference pattern and the normal to the light entrance surface or the light exit surface of the transmissive holographic optical element, and $\theta_c$ is the critical angle (unit: degree) of the transmissive holographic optical element calculated by arcsin (1/n) where n is an average refractive index of the transmissive holographic optical element, $$|\theta_G| \leq \theta_c \quad \text{[Equation 2]}$$

wherein in Equation 2, $\theta_G$ is an angle (unit: degree) with the smallest absolute value among angles formed by the normal to the interference pattern and the normal to the light entrance surface or the light exit surface of the reflective holographic optical element, and $\theta_c$ is the critical angle (unit: degree) of the reflective holographic optical element calculated by arcsin (1/n) where n is an average refractive index of the reflective holographic optical element.

2. The optical isolation element according to claim 1, wherein the first optical path changing element or the second optical path changing element has an average refractive index in a range of 1.4 to 1.6.

3. The optical isolation element according to claim 1, wherein the difference between the maximum refractive index and the minimum refractive index of the first optical path changing element is in a range of 0.01 to 0.03.

4. The optical isolation element according to claim 1, wherein the first optical path changing element has a thickness of 30 μm or more.

5. The optical isolation element according to claim 1, wherein the difference between the maximum refractive index and the minimum refractive index of the second optical path changing element is 0.06 or more.

6. The optical isolation element according to claim 1, wherein the second optical path changing element has a thickness of 10 μm or more.

7. The optical isolation element according to claim 1, wherein the apex angle of the triangle of the isosceles triangular prism film is in a range of 40 degrees to 50 degrees.

8. An optical isolation device comprising at least one optical isolation element of claim 1.

* * * * *